No. 818,164. PATENTED APR. 17, 1906.
P. HANNAGAN.
COVER AND TRAP FOR CATCH BASINS AND THE LIKE.
APPLICATION FILED JULY 11, 1905.

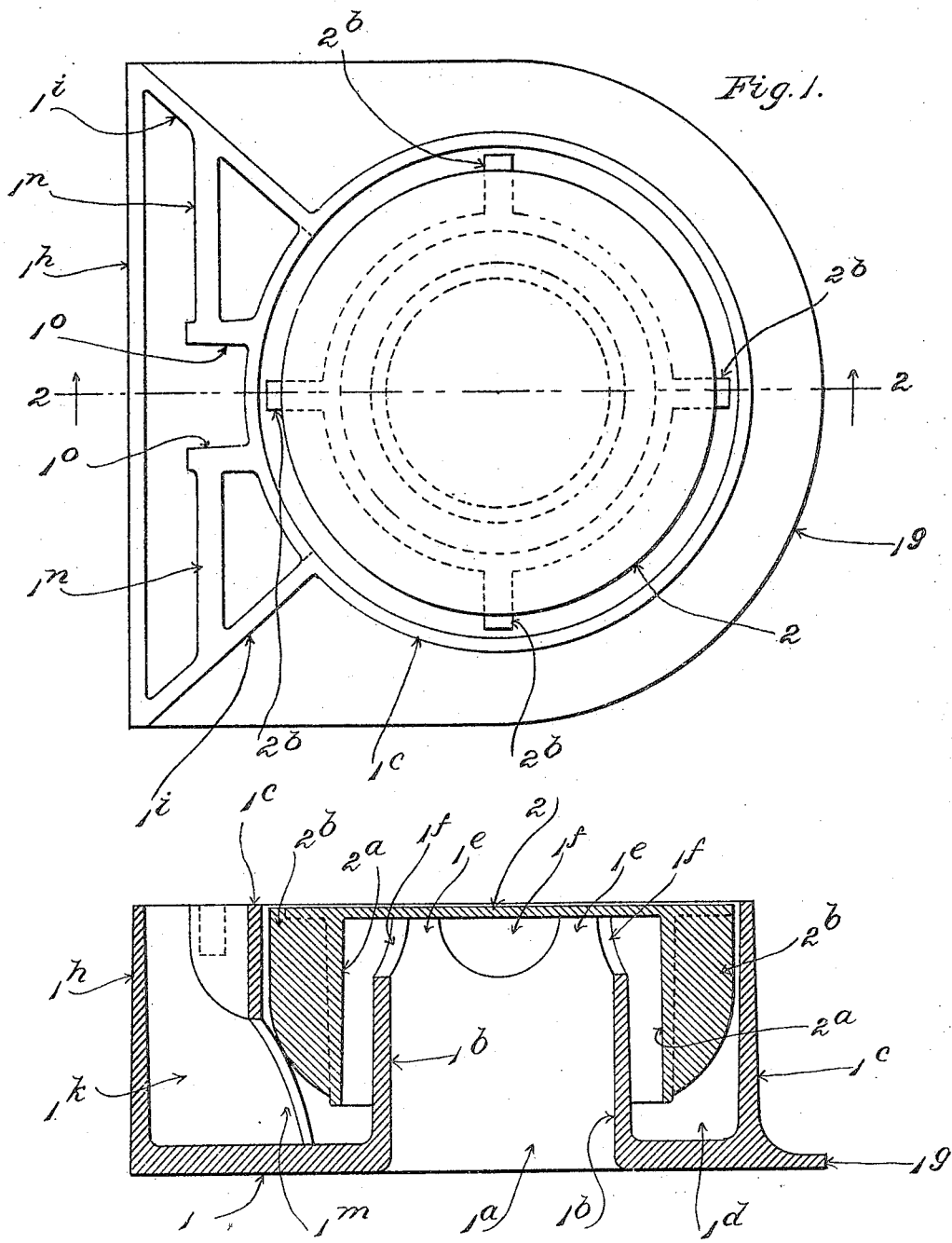

2 SHEETS—SHEET 2.

Witnesses:
Oscar F. Hill
Aline Tarr

Inventor:
Paul Hannagan
by Chas. F. Randall
Attorney.

UNITED STATES PATENT OFFICE.

PAUL HANNAGAN, OF LAWRENCE, MASSACHUSETTS.

COVER AND TRAP FOR CATCH-BASINS AND THE LIKE.

No. 818,164.  Specification of Letters Patent.  Patented April 17, 1906.

Application filed July 11, 1905. Serial No. 269,147.

*To all whom it may concern:*

Be it known that I, PAUL HANNAGAN, a citizen of the United States, residing at Lawrence, in the county of Essex, State of Massachusetts, have invented a certain new and useful Improvement in Covers and Traps for Catch-Basins and the Like, of which the following is a specification, reference being had therein to the accompanying drawings.

Figure 3:
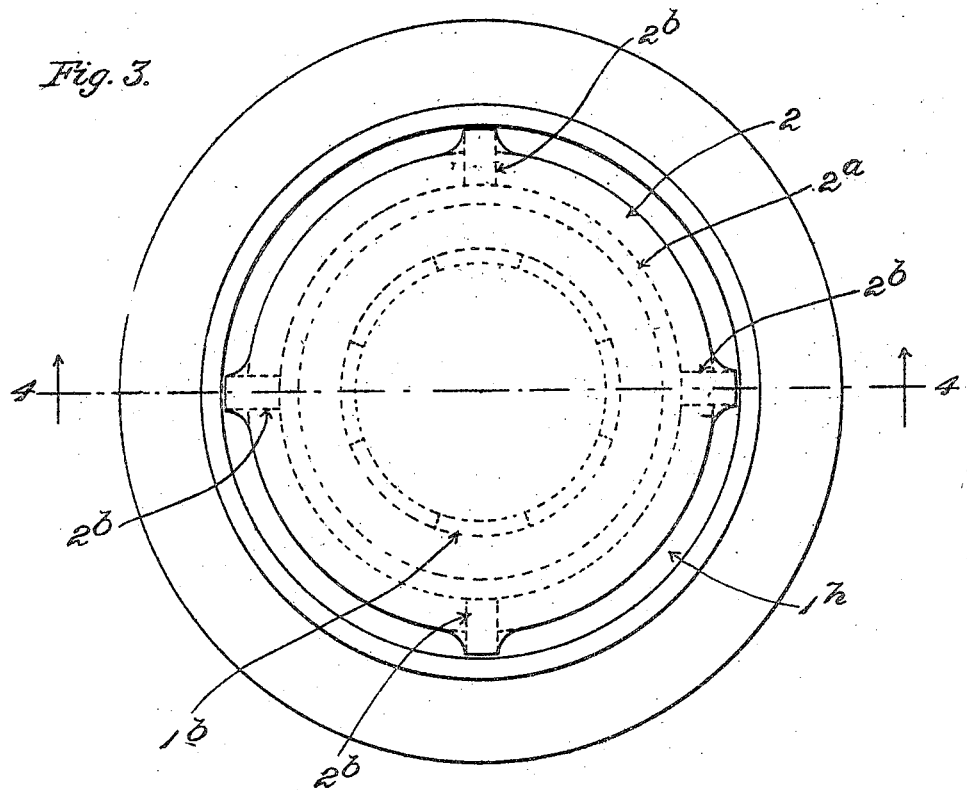
Figure 4:
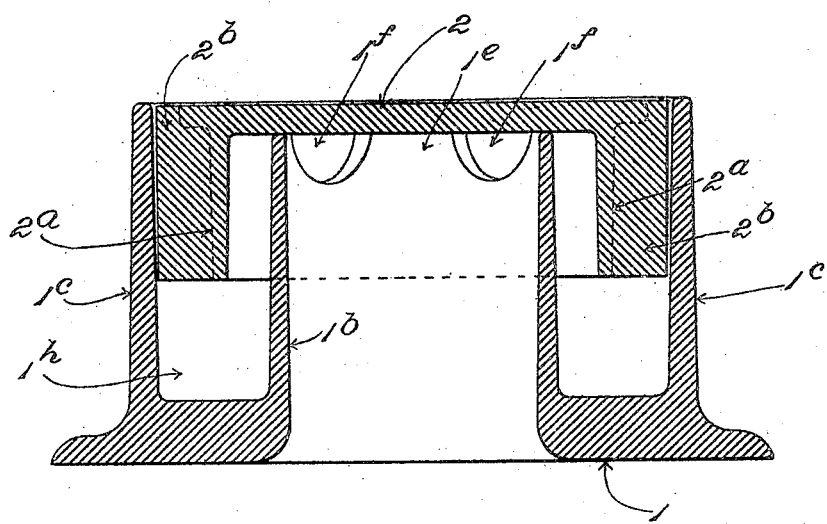

In the drawings, Figure 1 shows in plan a combined cover and trap for catch-basins and the like containing an embodiment of the invention. Fig. 2 is a view in vertical section on the transverse plane indicated by the dotted line 2 2 in Fig. 1. Fig. 3 is a plan of a modified form of combined cover and trap for catch-basins. Fig. 4 is a view in vertical section on line 4 4 of Fig. 3.

The cesspool or catch-basin cover of Figs. 1 and 2 consists of a main portion or body and a removable top. The said main portion or body is formed with a bottom plate 1, Fig. 2, having a central opening $1^a$, an inner wall or shell $1^b$ rising around the said central opening, an outer wall or shell $1^c$ rising from the bottom plate 1 and separated from the inner wall or shell $1^b$ by an intervening annular chamber $1^d$, which is concentric with the central opening $1^a$, and a horizontal flange $1^g$, which projects outward from the base of the casting. The said central opening serves for access and admission to the cesspool or catch-basin in connection with which the cover is employed. It permits of the introduction of cleaning implements and the entrance and exit of workmen and of the removal of accumulations, &c. The removable top comprises a plate 2, a downwardly-extending flange $2^a$, and radially-projecting vertical bars or lugs $2^b$ $2^b$ $2^b$, &c. The plate 2 rests upon upwardly-extending portions or projections $1^e$ $1^e$ $1^e$, &c., forming part of the inner wall or shell $1^b$, and the top is thereby supported when in place. The said plate is less in diameter than the outer wall or shell $1^c$, so that when the top is in place a space exists between the peripheral edge of the plate and the said outer wall or shell. The vertical bars or lugs $2^b$ $2^b$ $2^b$, &c., extend a short distance radially beyond the said peripheral edge, and by their contact with the outer wall or shell they keep the said edge at a uniform or substantially uniform distance from the said wall or shell all around. They also serve through such contact to keep the top from tipping. The space aforesaid intervening between the peripheral edge of the plate 2 of the top and the outer wall or shell $1^c$ constitutes an opening through which water may flow from above into the annular chamber $1^d$. The water which finds its way into the chamber $1^d$ rises therein above the lower edge of the flange $2^a$ of the removable top, submerging the lower portion of the said flange until it reaches the openings $1^f$ $1^f$ $1^f$ between the upwardly-extending portions $1^e$ $1^e$ $1^e$ of the wall $1^b$ and flows inward through the said openings into the central opening $1^a$, thus discharging into the cesspool or catch-basin. The water which is contained in the intervening chamber $1^d$ coöperates with the downwardly-extending flange $2^a$ of the top to form a liquid seal for the cover. The paving which is laid around the cover lies over and above the flange $1^g$ of the latter.

In Letters Patent of the United States for cesspools or catch-basins for sewers, granted to me under date of May 16, 1905, No. 790,254, I have shown, described, and claimed a cover for cesspools or catch-basins which is constructed to obviate the necessity, which existed prior to the date of the invention of the said Letters Patent, for cutting away or recessing the edge stone or curbing next which such cover is located or for employing a recessed cast-iron frame in lieu of the edge stone or portion of curbing next adjacent the cover or set into the said edge stone or portion of curbing. Previously the edge stone or curbing was cut away or recessed or the recessed cast-iron frame was employed in order to permit water which is unable to pass through the usual holes or inlets of the top of the cover to flow over the edge of the cover and down into the cesspool or catch-basin. In the invention which is set forth in the said Letters Patent the cover is constructed with vertical flanges at the side thereof which is placed adjacent the edge stone or curbing, the free edges of the said vertical flanges being designed to make contact with the plain outer face of the edge stone or curbing and the horizontal flange being omitted between the said flanges, so that a passage-way is produced through which water may pour into the cesspool or catch-basin. The described construction enables an edge stone having a plain outer face to be used and obviates the labor and expense of forming a recess in the edge stone. With the object in view of securing substantially the advantages just mentioned, in connection with a cover having a trap formed in the manner which has been explained in connection with Figs. 1 and 2, I extend the said cover transversely toward one side, as shown in the said figures, and shape the same to fit against the outer face of an edge stone or portion of curbing. Instead, however, of forming the cover with vertical flanges adapted to make contact with the outer face of the edge stone or curbing and with an opening between the said flanges for the downflow of water directly into the cesspool or catch-basin I extend the bottom plate 1 in the present instance outward to the said side of the cover and provide a wall $1^h$, which rises from the outer edge of the said bottom plate and is intended to make contact by its outer surface with the corresponding face of the edge stone or curbing. At the opposite ends of the walls $1^h$ other walls $1^i 1^i$, rising from the bottom plate 1, extend from the wall $1^h$ to the outer circular shell or wall $1^c$. The walls $1^h 1^i 1^i 1^c$ inclose a chamber $1^k$, which is open at the top and into which water may flow from above, the said wall $1^c$ having a transverse opening $1^m$ through the lower portion thereof, affording communication between the chambers $1^k$ and $1^d$, and through which the contents of the former may flow into the latter and, passing from chamber $1^d$ by way of openings $1^e$ $1^e$ $1^e$ of the inner wall or shell $1^b$, may discharge into the said pool or catch-basin. At $1^n 1^n$ and $1^o 1^o$ are bridging-flanges and lugs at the top of the chamber $1^k$, these flanges and lugs being intended to support the foot of an animal or rim of a wheel as the latter passes across above the said chamber and prevent the same from descending into the chamber $1^k$. It will be perceived from the foregoing that in use water may descend either by way of the annular space around the edge of the removable top 2 directly into the inner chamber $1^d$ or into the outer chamber $1^k$ and thence may pass through the opening $1^m$ into the chamber $1^d$.

Figs. 3 and 4 show a modification of the invention in which the outside chamber $1^k$ is dispensed with, the cover having a circular form.

I claim as my invention—

1. In a cesspool or catch-basin, or the like, in combination, a central wall or pipe, an inverted top or cup having a downturned shell or flange to form a water seal for said central wall or pipe, separated projections at the top of said central wall or pipe serving as supports for the said top or cup, and ribs or lugs serving to prevent horizontal movement of the said top or cup.

2. The cover for cesspools or catch-basins for sewers having the passage for downflow of water, inner and outer walls around such passage having a seal-chamber between them, an open-topped side chamber beyond said outer wall communicating with the seal-chamber, and a removable top having a depending shell or flange entering the said seal-chamber.

3. The cover for cesspools or catch-basins for sewers having the passage for downflow of water, inner and outer walls around such passage having a seal-chamber between them, an open-topped side chamber communicating with the seal-chamber, and a top having the depending shell or flange entering the said seal-chamber, with the opening adjacent the said top for entrance of water directly into the seal-chamber.

In testimony whereof I affix my signature in presence of two witnesses.

PAUL HANNAGAN.

Witnesses:
CHAS. F. RANDALL,
EDITH J. ANDERSON.